(12) United States Patent
Duncan

(10) Patent No.: US 7,874,565 B2
(45) Date of Patent: Jan. 25, 2011

(54) RUNNING BOARD BRACKET

(76) Inventor: Malcolm Duncan, P.O. Box 220, Okotoks, AB (CA) T1S 1A5

( * ) Notice: Subject to any disclaimer, the term of this patent is extended or adjusted under 35 U.S.C. 154(b) by 275 days.

(21) Appl. No.: 12/101,784

(22) Filed: Apr. 11, 2008

(65) Prior Publication Data

US 2008/0252034 A1    Oct. 16, 2008

(30) Foreign Application Priority Data

Apr. 13, 2007    (ZA) .......................... 07/3413

(51) Int. Cl.
    *B60R 3/00*    (2006.01)
(52) U.S. Cl. .................. 280/163; 280/164.1; 280/164.2
(58) Field of Classification Search ................. 280/163, 280/164.1, 164.2, 165, 169, 847, 800; 248/200, 248/201
    See application file for complete search history.

(56) References Cited

U.S. PATENT DOCUMENTS

| | | | | |
|---|---|---|---|---|
| 1,266,938 A | * | 5/1918 | Hassler | 280/163 |
| 5,382,035 A | * | 1/1995 | Waddington et al. | 280/169 |
| 5,501,475 A | * | 3/1996 | Bundy | 280/166 |
| 5,511,750 A | * | 4/1996 | Evenson | 248/200 |
| 5,769,439 A | * | 6/1998 | Thompson | 280/163 |
| 5,895,064 A | * | 4/1999 | Laubach | 280/163 |
| 6,533,302 B2 | * | 3/2003 | Scruggs et al. | 280/163 |
| 6,588,782 B2 | * | 7/2003 | Coomber et al. | 280/163 |
| 6,592,135 B2 | * | 7/2003 | Hendrix | 280/164.1 |
| 6,910,700 B2 | * | 6/2005 | Kayne | 280/164.2 |
| 6,959,937 B2 | * | 11/2005 | Schneider et al. | 280/163 |
| 7,083,179 B2 | * | 8/2006 | Chapman et al. | 280/163 |
| 7,287,770 B2 | * | 10/2007 | Drabant et al. | 280/163 |

* cited by examiner

*Primary Examiner*—Hau V Phan
(74) *Attorney, Agent, or Firm*—Oyen Wiggs Green & Mutala LLP

(57) ABSTRACT

The invention provides a running board bracket which includes an elongate arm formation which has a first end section which extends vertically and which is movingly engagable with a motor vehicle, an opposing second end section which extends horizontally and which is engagable with a running board and an angled formation between the first and second sections which has an attachment which is engagable with the motor vehicle. Also provided is a method for attaching a running board to a motor vehicle by way of a running board bracket of the aforementioned kind which includes the steps of movingly engaging the first section with the motor vehicle, movingly engaging the attachment with the motor vehicle, and engaging the running board with the second section.

5 Claims, 3 Drawing Sheets

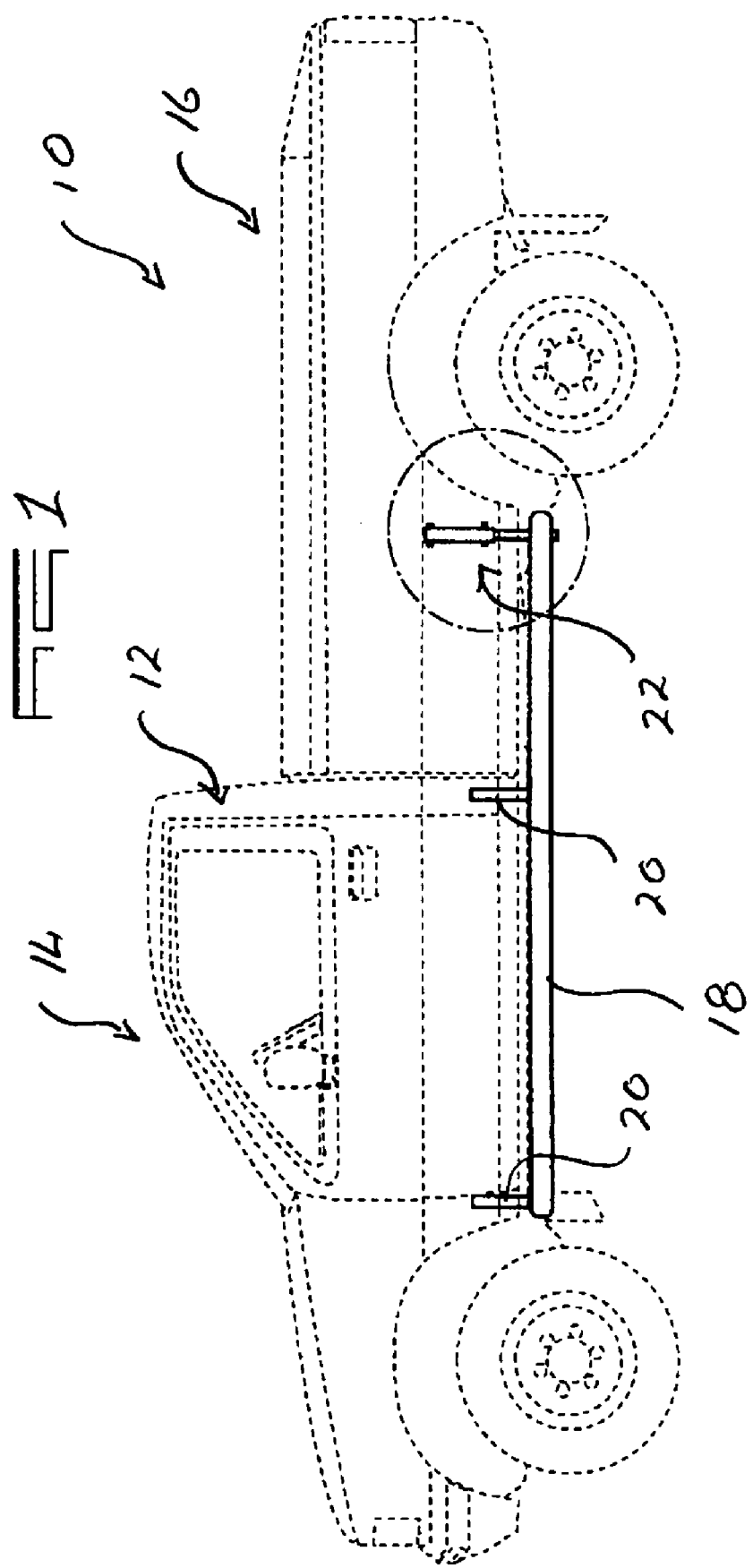

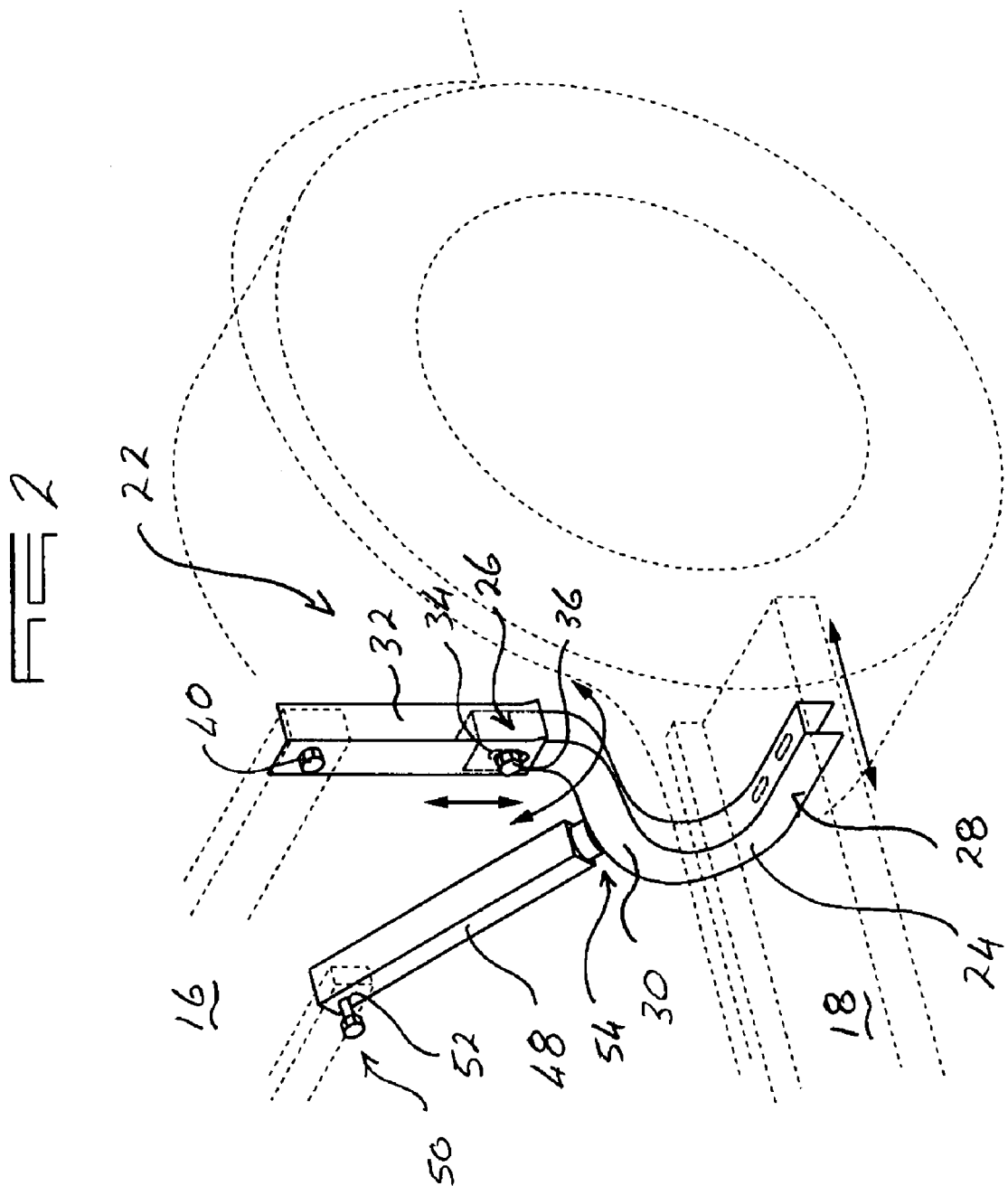

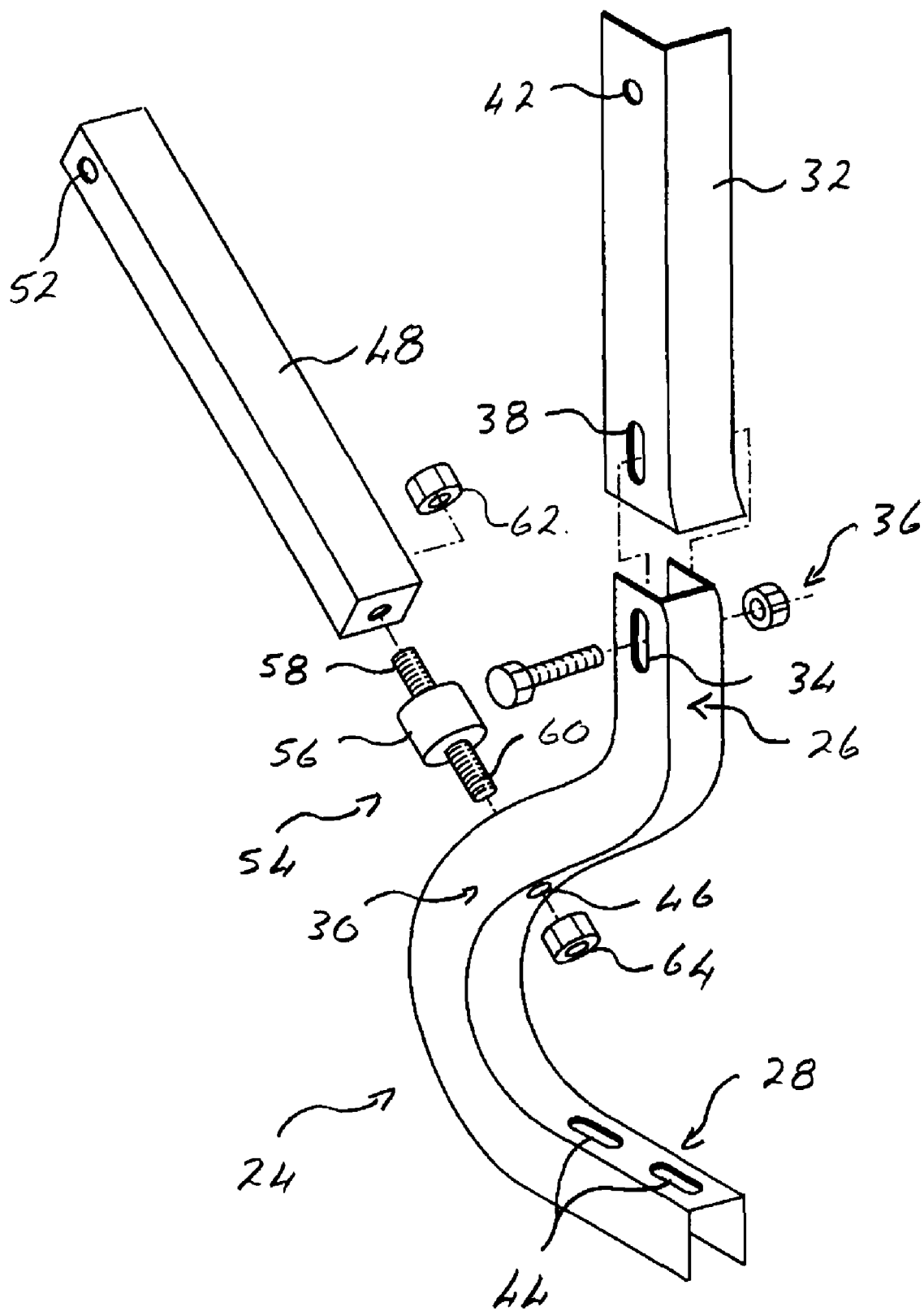

RUNNING BOARD BRACKET

REFERENCE TO RELATED APPLICATIONS

This application claims priority from South African application no. 2007-03413 filed 13 Apr. 2007.

BACKGROUND OF THE INVENTION

This invention relates to a running board bracket which is use to attach a running board to a motor vehicle.

Running boards are known and a running board can be used as a step for boarding a vehicle or as a protective flange for the side and lower sections of motor vehicle side panels. Alternatively a running board can be used purely for decorative purposes.

In some vehicles different parts of the chassis or body thereof are independently movable relatively to one another. A running board which extends between and which is fixed to the two parts of the vehicle is placed under stress during use which often results in failure of the running board or its attachment brackets.

SUMMARY OF THE INVENTION

The invention aims to provide an alternative running board bracket which might allow limited relative movement between a motor vehicle to which it is attached and a running board which is suspended there from.

The invention provides a running board bracket which includes an elongate arm formation which has a first end section which extends vertically and which is movingly engagable with a motor vehicle, an opposition second end section which extends horizontally and which is engagable with a running board and an angled formation between the first and second sections which has an attachment means which is engagable with the motor vehicle.

The first section may include a slot.

The second section may include at least one attachment opening. Preferably the second section includes two adjacent attachment openings. The attachment opening may be in the form of a slot.

The angle formation may be in the form of a bend in the arm formation.

The attachment means may be in the form of an aperture.

The running board bracket may include a first vertical support which extends between the motor vehicle and the first section and which is pivotally and slidingly engaged with the first section.

The running board bracket may include a second angled support which extends between the motor vehicle and the attachment means and which is movable relatively to the angled formation. Preferably the angled support is resiliently movable relatively to the angled formation.

The running board bracket may include a connector which is positioned between the angled support and the attachment means. The connector preferably includes a buffer which is resiliently deformable and two opposing shanks which extend from the buffer.

The invention also provides a method for attaching a running board to a motor vehicle by way of a running board bracket of the aforementioned kind which includes the steps of:

(a) Movingly engaging the first section with the motor vehicle;

(b) movingly engaging the attachment means with the motor vehicle; and (c) engaging the running board with the second section.

BRIEF DESCRIPTION OF THE DRAWINGS

The invention is further described by way of an example with reference to the accompanying drawings in which:

FIG. 1 is a schematic side view of a motor vehicle which has a running board which is attached to the vehicle by way of a running board bracket according to the invention;

FIG. 2 is a schematic perspective view of the vehicle, running board and brackets of FIG. 1; and FIG. 3 is a schematic, exploded view of the bracket of FIG. 1.

DESCRIPTION OF PREFERRED EMBODIMENT

FIG. 1 shows a motor vehicle 10 which in this example is in the form of a pick-up truck which has a chassis and body 12 which consists of a front, engine compartment and cab portion 14 and a rear load box portion 16. The front portion 14 is movable relatively to the rear portion 16.

A known running board 18 is attached to the vehicle 10 by way of known brackets 20 with which the running board 18 is fixed to the front portion 14 and a running board bracket 22 according to this invention with which the running board 18 is fixed to the rear portion 16.

As is illustrated in FIGS. 2 and 3 the bracket 22 has an elongate attachment arm 24 which extends from a first end section 26 to an opposing, second end section 28 and which has an angled section 30 in the form of a bend between the first section 26 and the second section 28.

The first section 26 extends vertically and is movingly engageable with the vehicle 10 by way of a first vertical support 32 which extends from the load box portion 16 to the first section 26. The first section 26 has a first elongate slot 34 through which a nut and bolt combination 36 extends. The nut and bolt combination 36 is trapped in first holes 38 in the vertical support 32. In this example the holes 38 are in the form of slots. The vertical support 32 is fixed to the load box portion 16 by way of a second nut and bolt combination 40 which extends through second holes 42 in the vertical support 32.

The first slot 34 and the positioning of the first nut and bolt combination 36 allows for vertical and pivotal movement of the attachment arm 24 relatively to the vertical support 32.

The second section 28 has two, spaced apart and adjacent attachment openings 44 which in this example are slotted. Alternatively a single attachment opening 44 can be used. The running board 18 is bolted to and engaged with the attachment arm 24 and through the attachment openings 44 in a known manner.

The angled section 30 has an attachment means 46 in the form of an aperture to which a second angled support 48 is attached. The angled support 48 is pivotally attached to the rear portion 16 by way of a third nut and bolt combination 50 which extends through third holes 52 in the angled support. A connector 54 is positioned between the angled support 48 and the aperture 46 to allow relative and resilient movement between the attachment arm 24 and the angled support 48. The connector 54 has a resiliently deformable buffer 56 which is made from a resiliently deformable, elastomeric material. Two opposing and threaded shanks 58, 60 extend from the buffer 56. The first shank 58 is fixed to the angled support 48 by way of a nut 62 and the second shank 60 extends through the aperture 48 and is attach to the attachment arm 24 by way of a second nut 64.

If required the nut 62, 64 can be tightened in a manner to allow relative sliding movement between the connector 54 and the angled support 48 and the attachment arm 24.

The buffer 56 resiliently restricts pivoting of the attachment arm 24 relatively to the vertical support 32 and allows limited vertical and horizontal movement of the attachment arm 24 relatively to the vertical support 32. Additionally the buffer 54 carry and absorb vertical and side loads.

The running board 18 is thus attached to the vehicle 10 by way of the bracket 22 by movingly engaging the first section 26 to the rear portion 16 by way of the vertical support 32, by movingly engaging the attachment means 46 to the rear portion 16 by way of the angled support 48 and by engaging the running board 18 to the second section 28.

As a result of the pivotally and sliding engagement of the attachment arm 24 to the vertical support 32 and the resiliently movable engagement between the attachment arm 24 and the angled support 48 relative movement of the attachment arm 24 and the rear portion 16 is allowed in a number of directions.

During use of the vehicle 10 and relative movement between the front portions 14 and the rear portion 16 stress on the running board 18 is limited as relative movement between the running board 18 and the rear portion 16 is allowed. The running board 18 however remains supported by the bracket 22 and can be used in a normal manner.

The invention claimed is:

1. A bracket for securing a running board to a vehicle comprising:
   a) a support with an upper end which is attachable to the vehicle and a lower end;
   b) an elongate attachment arm with a first end section which is attached to the lower end of the support whereby the elongate attachment arm is pivotally movable relative to the support, and a second end section which, in use, extends substantially horizontally and which includes formations for securing a running board to the second end section;
   c) an angled support which has an upper end which is pivotally attachable to the vehicle and a lower end; and
   d) a resilient buffer which connects the lower end of the angled support to the elongate attachment arm.

2. A bracket according to claim 1 wherein the first end section, in use, extends substantially vertically and the elongate attachment arm has an angled section between the first end section and the second end section.

3. A bracket according to claim 2 wherein the first end of the elongate attachment has a slot, allowing the elongate attachment to move vertically relative the lower end of the support.

4. A bracket according to claim 2 wherein the angled section of the elongate attachment arm is in the form of a bend.

5. A method for attaching a running board to a motor vehicle, comprising:
   a) providing a bracket having a support with an upper end which is attachable to the vehicle and a lower end, an elongate attachment arm with a first end section which is attached to the lower end of the support whereby the elongate attachment arm is pivotally movable relative to the support, and a second end section which, in use, extends substantially horizontally and which includes formations for securing a running board to the second end section, an angled support which has an upper end which is pivotally attachable to the vehicle and a lower end, and a resilient buffer which connects the lower end of the angled support to the elongate attachment arm;
   b) movingly engaging the upper end of the support of the bracket with the motor vehicle;
   c) movingly engaging the upper end of the angled support of the bracket with the motor vehicle; and
   d) engaging the running board with the second end section of the elongate attachment arm of the bracket.

* * * * *